United States Patent [19]

Taleff et al.

[11] 4,445,353

[45] May 1, 1984

[54] APPARATUS FOR MANUFACTURING HELICAL CORES

[75] Inventors: Alexander Taleff, Churchill Boro; Robert M. Brady, Salem Township, Westmoreland County; Thaddeus E. Blaszczak, Indiana, all of Pa.

[73] Assignee: Westinghouse Electric Corp., Pittsburgh, Pa.

[21] Appl. No.: 303,224

[22] Filed: Sep. 17, 1981

[51] Int. Cl.³ .................. B21D 11/08; B21D 11/06
[52] U.S. Cl. ......................................... 72/136; 29/605
[58] Field of Search .................. 29/596, 605, 609; 72/136, 137, 142, 82, 84, 86

[56] References Cited

U.S. PATENT DOCUMENTS

| | | | |
|---|---|---|---|
| 368,569 | 8/1887 | Caldwell | 72/136 |
| 908,860 | 1/1909 | Gustavsen | 72/136 |
| 1,107,005 | 8/1914 | White | 72/136 |
| 1,750,176 | 3/1930 | Hughes | 72/84 |
| 1,767,796 | 6/1930 | Hughes | 72/84 |
| 1,920,154 | 7/1933 | Carlson | 72/136 |
| 2,437,500 | 3/1948 | Bruegger | 72/136 |
| 2,812,794 | 11/1957 | Chapman | 72/136 |
| 2,845,555 | 7/1958 | Carpenter et al. | 310/216 |
| 3,438,232 | 4/1969 | Achler et al. | 72/465 X |
| 4,084,419 | 4/1978 | Dittrich et al. | 72/84 X |
| 4,116,033 | 9/1978 | Iwaki et al. | 72/142 |
| 4,193,281 | 3/1980 | Kulikov et al. | 72/136 X |
| 4,206,624 | 6/1980 | Asai et al. | 72/142 |

Primary Examiner—E. Michael Combs
Attorney, Agent, or Firm—William D. Lanyi

[57] ABSTRACT

An apparatus and method for manufacturing helically wound coils is disclosed which is capable of constantly producing dimensionally accurate edge-wound stator cores for dynamoelectric machines. The device uses a rotating ring of pins to pull a prepunched continuous strip of material between two components which operate cooperatively to deform the strip by thinning one of its edges. The deforming force is held constant to avoid aberrational deformations due to variations in strip thickness. A braking means provides tension on the strip as it progresses through its deformation and a suitable dereeler provides a continuous supply of straight, prepunched strip material. The apparatus provides for either two power driven deforming members or one power driven member and one idler.

36 Claims, 7 Drawing Figures

APPARATUS FOR MANUFACTURING HELICAL CORES

BACKGROUND OF THE INVENTION

This invention relates to the production of helically wound coils and, more particularly, to an apparatus for the manufacture of edgewound magnetic stator cores for dynamoelectric machines.

Stator cores of dynamoelectric machines, such as electric motors, generators or alternators, are commonly produced by stamping annularly shaped laminations from thin sheet metal and stacking these laminations together to form a cylindrical core with a central bore of a shape and size suitable to receive an associated rotor member. It is well known to those skilled in the art that this method is uneconomical because of the significant amount of scrap material that results from punching a plurality of circularly shaped objects from sheet metal.

It is also well known that significant material savings can be achieved by utilizing a continuous strip of magnetic material and helically rolling or forming it into the above-described cylindrical core shape. The idea of rolling or forming strip material on edge to form a helical coil is disclosed in U.S. Pat. No. 1,032,925 issued to Miller on July 16, 1912 which employs rigid guides to force a generally straight strip of material into a circular, edgewound shape. U.S. Pat. No. 1,920,144 was issued to Fisher on July 25, 1933 and discloses a combination of a punch press and a helical winding machine which also utilizes an arcuately shaped shoe to bend the strip material into a helical coil. The shoe, which is functionally similar to one described in Miller, exerts a force on one edge of the strip material and radially forces it to bend into a circular shape.

The use of forming shoes or guides, as described in both Fisher and Miller, is also disclosed in U.S. Pat. No. 3,464,101 issued to Zubal et al. on Sept. 2, 1969; U.S. Pat. No. 3,283,399 issued to Hart et al. on Nov. 8, 1966; U.S. Pat. No. 3,206,964 issued to Hart et al. on Sept. 21, 1965; U.S. Pat. No. 3,243,623 issued to Hart et al. on Mar. 29, 1966 and U.S. Pat. No. 3,062,267 issued to Hart et al. on Nov. 6, 1962. These devices, which utilize shoes, or guides, to form the helical coil, pull the strip material in such a way as to force one of its edges against the shoe. This contact forces the strip into a circular shape by guiding it around an axis of rotation, thus forming a helical coil.

Another technique used to form a helical, edgewound coil is to use pressing rollers to deform one edge of the strip in such a way as to reduce its thickness and therefore elongate it in a direction along its length. Since one edge is thus made longer than the other, the strip naturally tends to form into a curled shape. By continually thinning one edge in this way, the strip material is caused to bend into a generally helical shape. This technique is disclosed in U.S. Pat. No. 2,437,500 issued to Bruegger on Mar. 9, 1948; U.S. Pat. No. 1,920,154 issued to Carlson on July 25, 1933; U.S. Pat. No. 2,845,555 issued to Carpenter et al. on July 29, 1958 and U.S. Pat. No. 3,845,647 issued to Cockin on Nov. 5, 1974.

A somewhat similar technique is described in U.S. Pat. No. 4,193,281 issued to Kulikov et al. on Mar. 18, 1980. It utilizes a pointed shaping member that impresses a series of indentations along one edge of a strip of material in such a way as to elongate that edge and cause the curling of the strip to occur in a way similar to that achieved by the pressing roller method described above.

In order to cause the strip of material to travel in a circular path, some devices are equipped with a plurality of pins that fit into slots that have been prepunched into the strip. These pins are attached to a rotating disc and, once inserted into the slots, pull the material in a circular motion to form a helical coil. Devices that utilize pins in this way are described in Kulikov, Rediger, Zubal and the four patents of Hart et al. described above.

It has been found that the techniques described above are unable to produce cores in which the inside and outside diameters and axial tooth registration are consistent with stringent design tolerances. It is therefore an object of the present invention to provide a means for producing helical, edgewound cores that are dimensionally accurate.

SUMMARY OF THE INVENTION

The present invention relates to the manufacture of helically wound coils and, more particularly, to an apparatus for performing the edge winding of magnetic cores of dynamoelectric machines.

An apparatus made in accordance with the present invention utilizes a generally circular mandrel mounted on a drive shaft. An axial surface of the mandrel has a plurality of holes therethrough with each hole being perpendicular to the axial surface and disposed on a circle that is concentric with the axis of the drive shaft. A pin is slidably disposed in each hole with a means for extending the pin outward from the mandrel and retracting it back into it. The pins are shaped to fit in slots that lie between the teeth of the strip of material being wound.

Also on the axial face of the mandrel is an annular boss disposed radially outward from the circle of holes described above. A preferred embodiment of the present invention employs a boss that is triangular in cross section and extends axially away from the axial surface farther at the radially outer edge of the boss than at its radially inner edge. However, it is within the scope of the present invention to utilize a rotatable wheel in place of the boss portion of the mandrel. In applications where a wheel or roller is used to replace the boss, the mandrel would, of course, be of a smaller radial dimension and the roller would be positioned at a radial location identical to that of the boss that it replaces. Throughout the discussion below, the present invention will be described as having a boss portion on its mandrel but it should be understood that the present invention is not so limited and is equally functional with a rotatable wheel used in place of the above-mentioned boss. A rotatable wheel, or forming roll, is disposed proximate the boss in a manner that forms a wedge-shaped gap between the boss and the surface of the rotatable wheel. A preferred embodiment of the present invention utilizes a conical rotatable wheel and is capable of being tilted to describe any one of a plurality of preselected angles between it and the boss.

Extending tangentially away from the portion of the boss that is most proximate the rotatable wheel is a guide which is capable of restricting the movement of the strip material in all directions except along its length. The purpose of this guide is to restrict any random motion of the strip material as it enters the point between the boss and the rotatable wheel.

As a strip of material moves adjacent to the axial surface of the mandrel, a pin is extended axially from the mandrel and into a slot in the strip of material. This engagement, in conjunction with the rotation of the mandrel, causes the strip to be pulled along a line which is coincident with the circle of holes in the axial surface.

The pins are of a diameter which forms a precise slot root when the strip of material is bent into its helical shape. Since the pins are inserted into the bottom portion of each slot when the strip of material is straight, they limit the size reduction of each slot during the bending operation to the diameter of the pins. This forming operation thus bends each slot around a pin and results in a precise shape of each finished slot.

As the strip is pulled between the boss and the rotatable wheel, a constant force is exerted on the rotatable wheel in a direction toward and perpendicular to the axial face of the mandrel. This force deforms the strip between the rotatable wheel and the boss, causing the strip of material to assume the cross-sectional shape defined by the gap between these two members. It has been determined that a preferred shape of deformation consists of a generally symmetrical strip cross section with one edge thinner than the other. The thinner edge will become the outer edge of the helically wound core. The thinning operation causes an elongation of this edge which induces the strip to assume a bend which facilitates its later being pulled along a circular path by the pins as described above.

A strip guide is positioned proximate the point of deformation in such a way as to restrict the motion of the strip in all directions except directly toward the gap between the boss and the forming roll. The strip passes through this guide immediately prior to entering this deformation zone.

Prior to its entry into the guide, the strip of material is passed through a braking means which resists its movement into and through the guide toward the rotatable wheel and boss. This braking means provides a preselected tension on the strip which has been found to be beneficial in making dimensionally accurate cores.

This stretch forming technique allows for better spring-back control, and therefore superior dimensional control, and permits a smaller force to be applied to the forming roll by applying a pretensioning of the strip of material. Since a specific total stress is required for proper strip deformation, the tensioning operation provided by the braking means reduces the required force applied by the rotatable forming roll. The strip material, prior to entering the braking means is supplied from a reel of continuous strip stock mounted on a suitable dereeler.

It has also been found that, by providing a constant force between the rotatable wheel and the boss, a uniform deformation of the strip material can be achieved that is independent of variations in the thickness of the strip. Prior to this discovery, variations of strip thickness resulted in aberrations in the strip's deformation and elongation.

It has further been determined that by combining the use of the rotating circle of pins with the deforming operation, cores that are dimensionally accurate can be consistently produced. It is believed that the constant force, as opposed to constant position, of the rotatable forming roll provides the consistency of deformation that, in conjunction with the above-described forming of the slots around the pins, results in the dimensionally accurate cores.

The rotatable forming wheel of the present invention can be power driven or run as an idler. Successful results have been experienced under both conditions. Furthermore, the angular velocity of a powered rotatable wheel of the present invention can be regulated as a percentage of the angular velocity of the mandrel. It is this capability that allows the present invention to assure identical surface speeds of the mandrel and the forming roll for all sizes of mandrels, which are replaceable to accommodate various lamination diameters or slot configurations.

DESCRIPTION OF THE PREFERRED EMBODIMENT

The present invention relates to the manufacture of magnetic cores and, more particularly, to the edge winding of helical cores for dynamoelectric machines in such a way as to assure the dimensional accuracy of finished cores.

Figure 1:
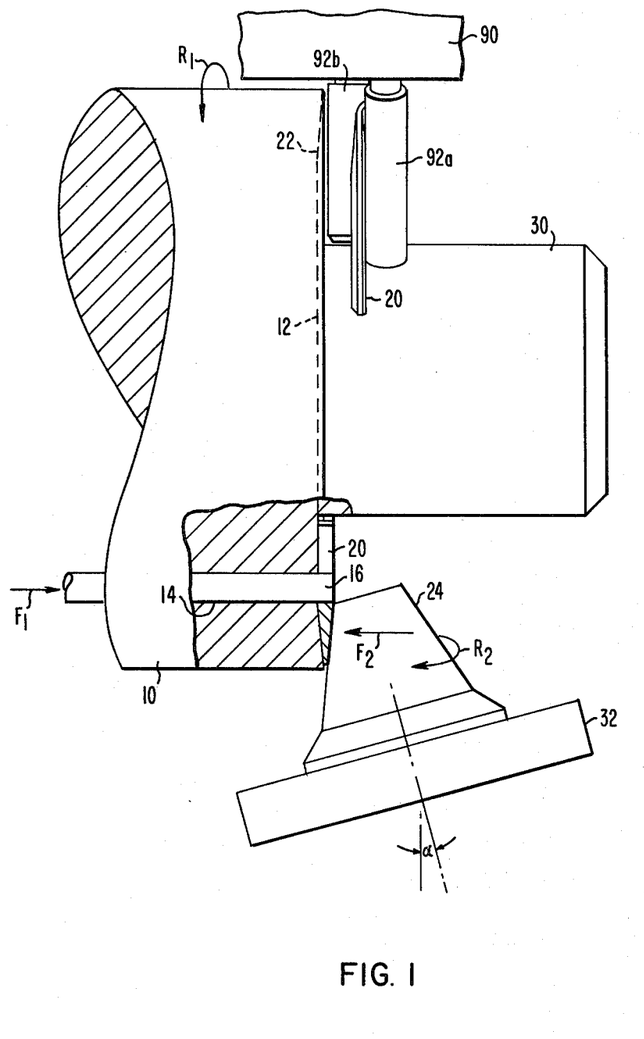
FIG. 1 shows the metal forming portion of the present invention.

As shown in FIG. 1, a core winding machine made in accordance with the present invention comprises a rotatable member, or mandrel 10, with an axial surface 12. Perpendicular to this axial surface, a plurality of holes 14 extend through the mandrel and are shaped to receive pins 16 slidably disposed therein. The pins 16 are associated with the mandrel in such a way as to be able to extend axially beyond the axial surface 12 upon the exertion of a force $F_1$ in that direction. The pins 16 are shaped to fit into a slot in a continuous strip of material 20 which is to be helically wound into a magnetic core.

The mandrel is rotatable in the direction shown by arrow $R_1$ and is equipped with a boss 22 on its axial surface 12. In cooperation with a pressing, or forming, roller 24, the boss 22 is shaped in such a way as to be able to deform the strip of material 20 into a predetermined cross-sectional shape. The pressing roller 24, or forming roll, is rotatable in the direction shown by arrow $R_2$ and can be either a power driven or an idler roller.

The forming roll 24 is tiltable to a preselected angle in order to achieve specific deformations of the strip material 20. Furthermore, the forming roll 24 is equipped with a means for exerting a constant force $F_2$ against the strip regardless of any variation in the strip's thickness that may occur. It is believed that this ability to exert a constant force $F_2$ on the strip 20, along with the insertion of the pins 16 prior to forming, contributes significantly to the successful manufacture of dimensionally accurate cores.

As the mandrel 10 rotates, the pins 16 which extend through the strip 20 pull the strip into a generally circular shape adjacent the axial face 12 of the mandrel 10. As the pins 16 later retract from the strip, it tends to spring away from the axial surface and migrate onto the stub shaft 30 portion of the rotatable mandrel 10. This stub shaft 30 is not an absolute necessity to the operation of the present invention but serves a useful purpose in retaining the accumulating helical coil until it is severed from the continuous strip of material and removed from the machine.

The forming roll 24 is mounted on a tiltable table 32 by which the effective angle $\alpha$ of the forming roll 24 can be controlled. The table 32, besides being tiltable, is movable in the direction shown by arrow $F_2$ and in the reverse direction. This mobility not only permits the forming roll 24 to compensate for variations of strip 20 thickness by responding to the constant force $F_2$, but also facilitates loading of new strips 20 by temporarily sliding away from the mandrel 10. It can be any suitable type of table that permits the axis of rotation of the forming roll to be varied and is capable of transmitting a constant form $F_2$ to the forming roll 24 as described above.

Figure 2:
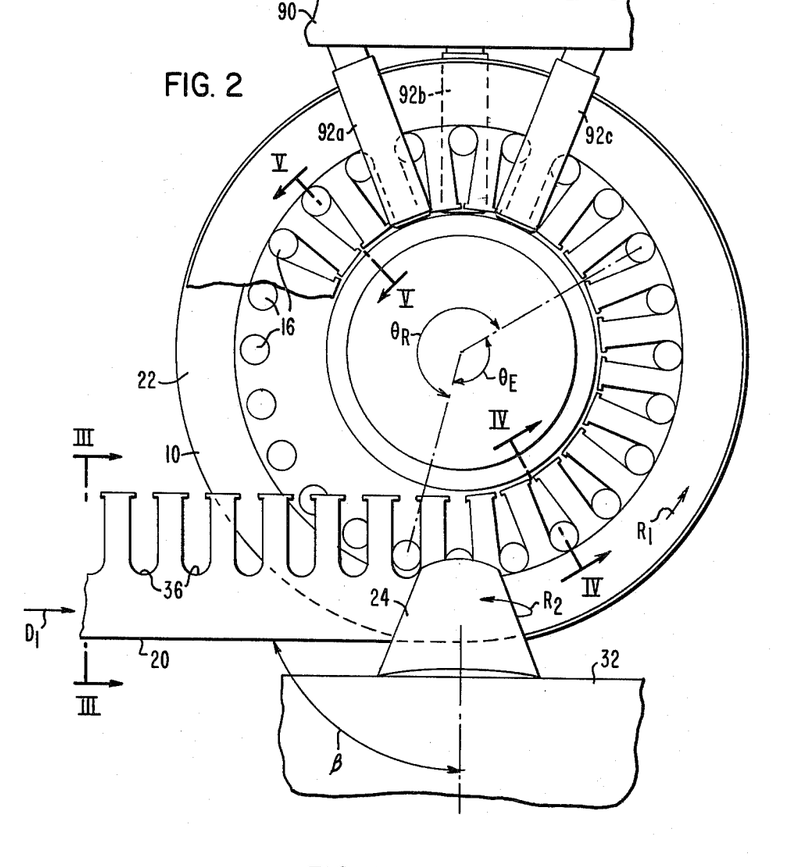
FIG. 2 illustrates the rotatable disc and forming roll of the present invention in conjunction with a segment of strip material.

FIG. 2 shows another view of the present invention in which the strip 20 of material is shown moving toward the forming roll 24 and then passing between the forming roll 24 and the boss 22 portion of the rotatable mandrel 10. Prior to the strip's deformation by these two cooperating members, a pin 16 is caused to be extended axially outward from the mandrel's axial face and into the slot 36 of the strip 20. It should be understood that the pins' 16 ability to extend and retract from the mandrel's face 12 is useful in inducing the helically formed strip 20 to migrate away from the mandrel 10. However, a machine made in accordance with the present invention could employ pins fixed to the mandrel 10 used in conjunction with a means for stripping the wound strip 20 away from the mandrel's face 12. This movement, along with the rotation of the rotatable mandrel 10, causes the straight strip 20 to be pulled toward the forming roll 24 in the direction shown by arrow D and continue to be pulled into a circular shape in the direction shown by arrow $R_1$. The pins 16 remain in this extended position for a portion of their revolution illustrated by angle $\theta_E$ and are then retracted for the remainder of a complete revolution shown as angle $\theta_R$. The precise magnitude of the angle of extension, $\theta_E$, is not critical to the successful operation of the present invention, but it should be noted that the pins should be extended into the strip 20 prior to its deformation by the forming roll 24 and boss 22 and remain in the extended position beyond the point where the deformation occurs.

It should also be noted that, as shown in FIG. 2, the size of the pins 16 are also chosen to facilitate the shaping of the root section of the strip's slot 36 during the deformation. If the pin diameter is properly chosen, the shape of the root section of the slot 36 is determined by the strip material being formed around the pin 16. As described above, the forming of the slot 36 around the pin 16 is an important feature which contributes significantly to the dimensional accuracy of the finished core.

In FIG. 2, the forming roll 24 is shown rotating, in the direction shown by arrow $R_2$, in cooperation with the rotatable mandrel 10. This cooperation reduces the thickness of the strip 20 at its outer portion with the reduction varying from virtually nothing at the ironing mark to a maximum at the strip's outer edge. The reduction in thickness corresponds to the strip's elongation in length at its outer edge and induces the strip to bend in a direction coincident with its eventual finished shape. As shown in FIG. 2, the forming roll 24 is positioned in such a way as to form an angle $\beta$ between its center line and the straight strip 20. It has been found that the dimensional accuracy of the core, in the tooth region, is improved if the angle $\beta$ is slightly greater than 90°. More specifically, when angle $\beta$ is approximately 92°, the teeth are more properly formed in a manner in which they are more precisely radial than if angle $\beta$ is exactly 90°. The effect of this slight offset from 90° is to more positively seat the pins 16 into the grooves 36 during the deformation of the strip 20 and avoid skewing the teeth in a nonradial direction.

Both FIGS. 1 and 2 show a straightener which incorporates a rigid support structure 90 and three rollers (92a, 92b and 92c). The purpose of this straightener is to eliminate any existing bend in the rolled strip 20 which would result in a concave or dished core. Each turn of the wound core should be a flat annular shape in order to assure dimensional accuracy and facilitate later coil assembly operations. The rolled strip 20 is passed between the rollers, as shown in FIG. 2, with rollers 92a and 92c on one side of the strip 20 and roller 92b on the other. The center roller 92b can be moved toward or away from a line connecting the center lines of the other two rollers in order to create a slight flexing of the strip 20 as it passed between the rollers. It has been found that this flexing operation is sufficient to remove any slight amount of concavity which is caused by the roll forming operation. The axis of each roller (92a, 92b and 92c) is aligned with the center line of the mandrel, which is also the center line of the annularly shaped strip 20 to avoid slippage between the strip 20 and the three rollers. Although this straightener has been specifically described as a support structure 90 with three rollers, it should be understood that other devices which can similarly flex the rolled strip can be used to perform the same function.

Figure 3:
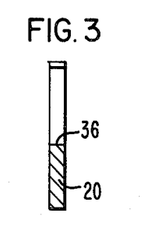
FIG. 3 is a cross sectional view of the strip of material of FIG. 2 prior to its deformation.
Figure 4:
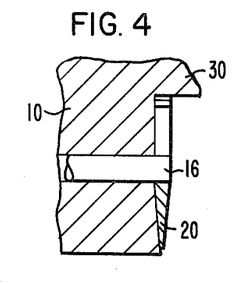
FIG. 4 is a cross sectional view of the strip of material of FIG. 2 immediately after its deformation with a pin extending therethrough.
Figure 5:
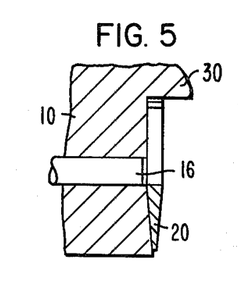
FIG. 5 is a cross sectional view of the strip of material of FIG. 2 after the pin has been retracted from its slot.

FIGS. 3, 4 and 5 illustrate section views of the strip 20 shown in FIG. 2. FIG. 3 shows a cross-section of the strip 20 before it is deformed by the interaction of the boss and forming wheel. FIG. 4 depicts the strip 20 immediately after its deformation. The pin 16 is extended axially outward from the axial surface of the mandrel 10 and through a slot 36 in the strip 20. This extension, as described above, allows the pin 16 to exert a force on the strip 20 and, in cooperation with the rotatable mandrel, pulls the strip 20 along a circular path to form its helical shape.

Also in FIG. 4, the deformation of the strip 20 at its outer portion can be seen. It should be understood that, for purposes of illustration, the thickness of the strip 20 has been exaggerated in relation to the mandrel 10 and pin 16. It should be apparent from FIG. 4 that the deformation on one side of the strip is a function of the shape of the boss and the deformation of the other side is a function of the angle of the forming roll (not shown in FIG. 4). As described above, the boss 22 could be replaced by a second forming roll which, working in conjunction with the forming roll 24 shown in the figures, would provide the compressive force required to deform the outer edge of the strip 20. When the second forming roll is used to replace the boss 22, the mandrel 10 would have a smaller radius and a flat face 12 with no boss 22.

FIG. 5 shows a cross-sectional view of the strip 20 at a point which is further rotated from the point of deformation. The pin 16 is retracted out of the strip's slot 36 and into the mandrel 10 and the strip 20 is free to migrate away from the axial surface of the mandrel 10 and onto the stub shaft 30.

Figure 6:
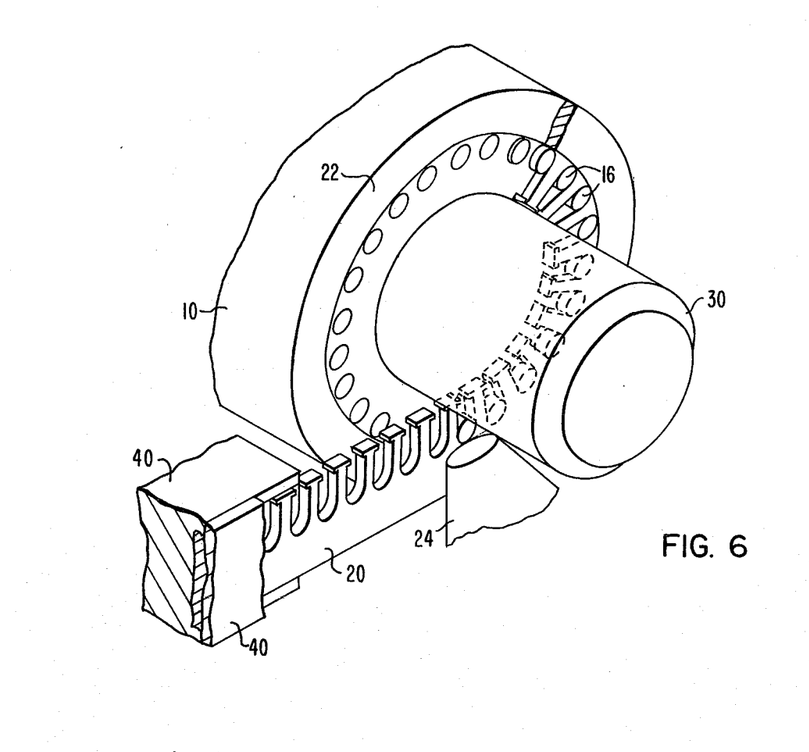
FIG. 6 is an isometric view of the components of the present invention shown in FIGS. 1 and 2.

FIG. 6 is an isometric view of the rotatable mandrel 10 and forming roll 24 showing the relative positions of the strip guide 40, stub shaft 30 and pins 16 of the present invention. The cover of the strip guide 40 has been removed in order to more clearly show the strip 20 of material as it moves toward the point of deformation between the annular boss 22 and the rotatable forming roll 24.

Figure 7:
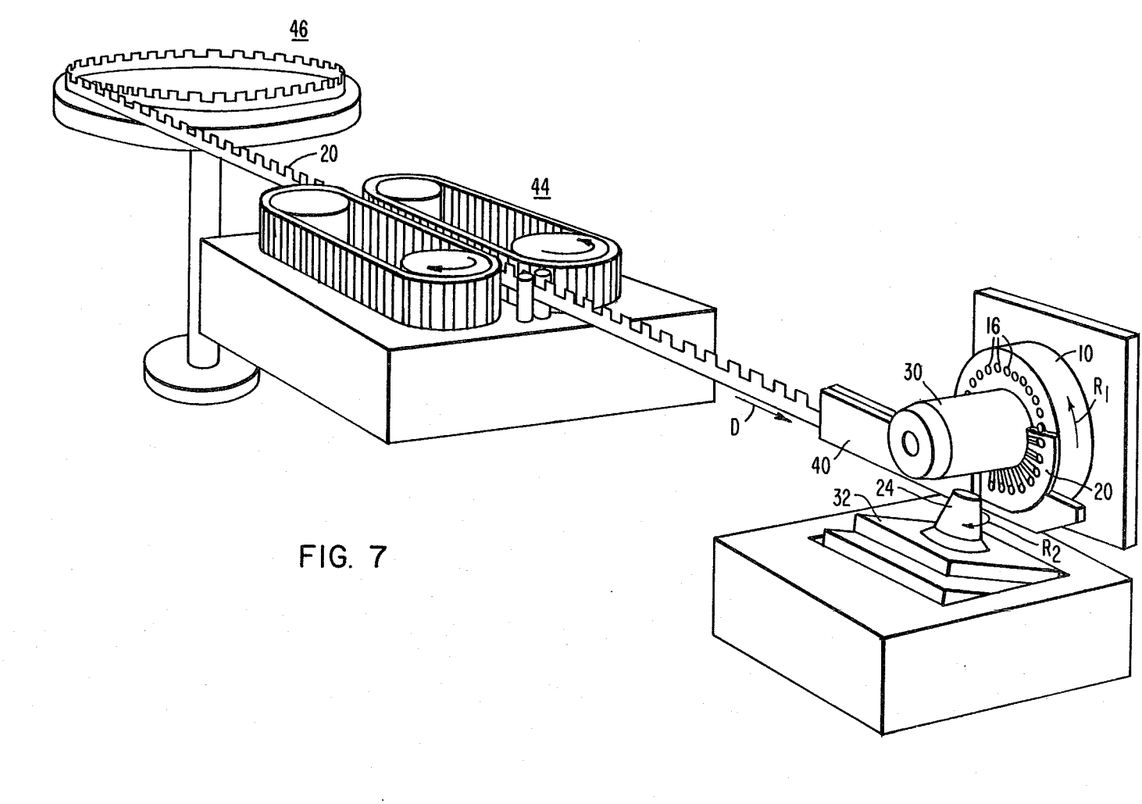
FIG. 7 is a view of the present invention showing the dereeler, means for supplying strip tension and strip guide.

FIG. 7 shows the present invention with its means for providing a tension force on the strip in a direction away from the point of deformation. Although this is shown as a pair of tractor belts 44 in FIG. 7, it should be understood that any suitable means for providing this tension could be used.

Also shown in FIG. 7 is a dereeler 46 that supplies a continuous strip 20 of material to the rotatable mandrel. Although the dereeler 46 and tensioning means 44 are shown in FIG. 7 as separate components, it should be understood that a single component could be utilized to perform both functions. It should further be understood that the strip 20 could be fed directly from a punch press instead of a dereeler 46 which supplies a continuous source of prepunched strip material 20.

Through extensive experimentation, it has been determined that the successful operation of the present invention can be attributed to the cooperative association of several of its components. The constant pressure supplied to the forming roll 24, and the fact that this constant tension is applied through a guide 40, produces a uniform deformation of the strip 20 which is independent of variations of the strip's thickness. The guide 40 serves the additional function of exerting a force on the strip in a direction toward the center of rotation of the mandrel 10. This force assures that the pins 16 are located at the extreme bottom of each slot at the instant of deformation of the strip. Former edge winding methods controlled only the position of a forming roll relative to the strip. This characteristic results in the strip's deformation being dependent on the strip's thickness. If a portion of the strip is thinner than expected, it passes through the point of deformation with less that anticipated deformation and, correspondingly, with less of a bend than is required. Of course, it should be apparent that an aberrationally thick portion would have the opposite, but equally deleterious, result.

Also of importance to the successful results obtained with the present invention is the cooperation of the pins 16 with the tensioning means 44 to provide a tensile force on the strip 20 as it passes through the point of deformation. It has been experimentally found that the required amount of restrictive force on the strip is a function of the strip's physical characteristics and a variation thereof will determine the dimensional accuracy of the finished helical coil.

The pins 16 themselves are sized to not only provide a force along the strip's length but to also provide a shape around which the root of the strip's slot can be formed as the strip is bent into a circular shape. As described above, the pins 16 are extended during a portion of the mandrel's rotation and retracted during the remainder of each revolution. This is performed by a cam plate in cooperation with individual retracting springs on each pin, but it should be understood that other methods could equally be utilized to result in this reciprocating movement.

It should be further understood that a device could be constructed in accordance with the present invention that utilized pins that were continually extended beyond the axial surface of the mandrel if the strip's slot shape allowed this technique. The main purpose of the pins' reciprocating action is to prevent interference between the pins and the teeth of the strip in the area where the straight strip initially approaches the circle of pins in a tangential direction.

However, as discussed above, fixed pins could be used if other means are used to cause the strip 20 to migrate away from the mandrel 10. Other means would also be required to avoid interference between fixed pins and the incoming straight strip. This could be accomplished by feeding the strip toward the point of deformation at a slight angle to the face of the mandrel instead of along a line coincident with the plane of the mandrel's face.

The strip guide of the present invention maintains the strip's proper position and attitude as it approaches the point of deformation. It also prevents movement of the strip immediately prior to its entry between the boss and the forming roll.

Also, the strip guide exerts a force on the straight strip toward the mandrel's center of rotation which positively positions the pins at the extreme bottom of each slot at the instant of deformation.

A cutoff means can be provided at any convenient location proximate the helical strip. The exact position of the means for severing the strip will, of course, depend on the way in which the accumulating length of helical coil is measured.

It has also been empirically discovered that the forming roll can be operated as a power driven component or as an idler. This choice affects the dimensional accuracy of the finished core's shape and is a function of the physical properties of the strip of material being wound.

The present invention is operated continuously with no intermittent starting and stopping of the rotating mandrel on the forming roll. The reciprocating motion of the pins is coordinated with this rotation by a cam and, therefore, the apparatus described herein results in a continual output of helically wound strip material. A flying cutoff can be employed to sever a wound core from the continuing supply of strip material. The cutoff device is activated when a preselected number of helical turns have been produced.

It should be apparent to one skilled in the art that a device is disclosed herein which produces helically wound cores from a continuous source of strip material in such a way as to produce the roll formed coils in a dimensionally accurate manner while allowing significant flexibility of adjustment to respond to variations of thickness and physical characteristics of the strip material being wound.

It should further be apparent that, although the present invention has been described in considerable detail by way of illustration, it should not be considered to be so limited.

What we claim is:

1. An apparatus for manufacturing magnetic cores for electrical machines by bending a continuous strip of material edgewise into a coil, said strip having a plurality of recesses therein, said apparatus comprising:
- a rotatable mandrel having an axial surface, said axial surface having a plurality of holes therethrough;
- a plurality of pins, each of said pins being slidably disposed in a preselected one of said plurality of holes, each of said pins being shaped to fit into one of said plurality of recesses in said continuous strip of material;
- a raised portion of said axial surface, said raised portion being located at the radially outermost section of said rotatable mandrel, said raised portion extending axially outward from said axial surface;
- means for pressing said continuous strip of material against said axial face of said rotatable mandrel, said pressing means being shaped to cooperate with said raised portion to shape continuous strip of material into a predetermined cross section, said pressing means being associated with said raised portion of said mandrel to reduce the cross section of one edge of said continuous strip of material said predetermined cross section being generally uniform in shape along the length of said continuous strip of material;
- means for rotating said rotatable mandrel;
- means for forcing said pressing means toward said rotatable mandrel;
- means for permitting movement of said pressing means relative to said axial face of said rotatable mandrel during deformation of said continuous strip therebetween to maintain a generally constant force on said continuous strip despite variations in strip thickness;
- means for causing said pins to axially extend beyond said axial surface of said rotatable mandrel; and
- means for retracting said pins from said axially extended position.

2. The apparatus of claim 1, further comprising:
means for rotating said pressing means.

3. The apparatus of claim 1, further comprising:
means for exerting a force on said continuous strip of material in a direction away from said pressing means.

4. The apparatus of claim 1, further comprising:
means for severing said continuous strip of material.

5. The apparatus of claim 1, further comprising:
means for guiding said continuous strip of material toward said pressing means.

6. The apparatus of claim 1, further comprising:
means for supplying said continuous strip of material from a reel of said material toward said pressing means.

7. The apparatus of claim 2, further comprising:
means for causing said means for rotating said pressing means to operate at a speed which is a preselected percentage of the speed of said means for rotating said rotatable mandrel.

8. The apparatus of claim 1, further comprising:
means for tilting said pressing means to a preselected angle relative to said axial surface of said rotatable mandrel.

9. The apparatus of claim 1, wherein:
the cross-sectional shape of said pins is pre-selected to affect the shape of said slots in cooperation with said pressing means.

10. An apparatus for helically winding a core element consisting of a strip of material having a solid portion with a plurality of teeth extending therefrom with slots between said teeth, said apparatus comprising:
- a first rotatable member having an axial surface generally perpendicular to its axis of rotation, said first rotatable member having a plurality of holes therethrough, said holes being generally perpendicular to said axial surface, said holes being associated in an annular configuration with said center of rotation being generally equidistant from each of said holes;
- a plurality of pins, each of said pins being slidably disposed in a preselected one of said plurality of holes, each of said pins being shaped to fit into said slots in said strip of material;
- an annular boss on said axial surface displaced radially outward from and generally concentric with said plurality of holes;
- a second rotatable member, said second rotatable member being disposed proximate said boss;
- means for rotating said first rotatable member;
- means for forcing said second rotatable member toward said axial face of said first rotatable member; and
- means for permitting movement of said second rotatable member relative to said axial face of said first rotatable member during deformation of said strip material therebetween to maintain a generally constant force on said strip material despite variations in strip thickness.

11. The apparatus of claim 10, further comprising:
a means for extending said pins axially outward from said axial face; and
a means for retracting said pins within said first rotatable member.

12. The apparatus of claim 11, wherein:
said extending means is a cam plate.

13. The apparatus of claim 10, wherein:
said second rotatable member is an idler roll.

14. The apparatus of claim 10, further comprising:
means for rotating said second rotatable member.

15. The apparatus of claim 10, further comprising:
means, proximate said first rotatable member, for severing said strip of material.

16. The apparatus of claim 14, further comprising:
means for preselecting the rotational speed of said second rotatable member as a percentage of the rotational speed of said first rotatable member.

17. The apparatus of claim 10, further comprising:
means for tilting said second rotatable member in relationship to said axial surface of said first rotatable member.

18. The apparatus of claim 10, wherein:
said boss and said second rotatable member are cooperatively associated to produce a preselected deformation of said strip of material.

19. The apparatus of claim 16, wherein:
said strip of material is deformed to make its solid edge thinner than its toothed portion.

20. The apparatus of claim 17, further comprising:
means for accurately preselecting the angle of said tiltable second rotatable member.

21. The apparatus of claim 10, further comprising:
means for guiding said strip of material toward a point between said boss and said second rotatable member.

22. The apparatus of claim 10, further comprising:

means for exerting a force on said strip of material in a direction away from said second rotatable member.

23. The apparatus of claim 10, further comprising:
means for dereeling a reel of said strip of material toward said second rotatable member.

24. The apparatus of claim 22, wherein:
said force exerting means is a tractor brake.

25. The apparatus of claim 10, wherein:
the cross-sectional shape of said pins is preselected to affect the shape of said slots in cooperation with said pressing means.

26. An apparatus for helically winding a core element consisting of a strip of material having a solid portion with a plurality of teeth extending therefrom with slots between said teeth, said apparatus comprising:
a first rotatable member having an axial surface generally perpendicular to its axis of rotation;
a plurality of pins, each of said pins being disposed about said axial surface, said pins being generally perpendicular to said axial surface, said pins being associated in a generally annular configuration with said center of rotation being generally equidistant from each of said pins;
means for compressing one edge portion of said strip;
means for rotating said rotatable member; and
means for permitting movement of said compressing means during deformation of said strip material thereby to maintain a constant force on said strip material despite variations in strip thickness.

27. The apparatus of claim 26, wherein:
said pins are sized to fit into said slots with a minimal clearance.

28. The apparatus of claim 26, further comprising:
means for severing said strip.

29. The apparatus of claim 26, wherein:
said strip is deformed to make its solid edge thinner than its toothed edge.

30. The apparatus of claim 26, further comprising:
means for guiding said strip toward said compressing means.

31. The apparatus of claim 26, further comprising:
means for exerting a force on said strip in a direction away from said compressing means.

32. The apparatus of claim 26, further comprising:
means for dereeling a reel of said strip toward said compressing means.

33. The apparatus of claims 1, 10 or 26, further comprising:
means for flexing said strip of material in a direction perpendicular to its planar surface, said flexing means being rigidly mounted.

34. The apparatus of claim 33, wherein:
said flexing means comprises a support structure with three rotatable pins extending therefrom.

35. The apparatus of claim 34, wherein:
said rotatable pins extend from said support structure in a direction perpendicular to the edges of said strip and generally parallel to the planar surfaces of said strip.

36. The apparatus of claim 26, wherein:
the cross-sectional shape of said pins is pre-selected to affect the shape of said slots in cooperation with said pressing means.

* * * * *